United States Patent [19]

Shimizu et al.

[11] Patent Number: 4,824,616

[45] Date of Patent: Apr. 25, 1989

[54] METHOD FOR THE PRODUCTION OF SPHERICAL SILICONE GEL PARTICLES

[75] Inventors: Koji Shimizu, Ichihara; Mitsuo Hamada, Kisarazu, both of Japan

[73] Assignee: Toray Silicone Company, Ltd., Tokyo, Japan

[21] Appl. No.: 200,828

[22] Filed: Jun. 1, 1988

[30] Foreign Application Priority Data

Jun. 5, 1987 [JP] Japan ................................. 62-141051

[51] Int. Cl.$^4$ ................................................ B29B 9/00
[52] U.S. Cl. ............................................ 264/7; 528/15; 528/31; 528/32; 525/478; 427/222; 264/14; 428/405
[58] Field of Search ........................... 528/15, 31, 32; 525/478; 427/222; 264/7, 14; 428/405

[56] References Cited

U.S. PATENT DOCUMENTS

| | | | |
|---|---|---|---|
| 3,155,590 | 11/1964 | Miller et al. | 264/7 |
| 4,277,426 | 7/1981 | Kato et al. | 264/14 |
| 4,517,238 | 5/1985 | Mine et al. | 428/212 |
| 4,594,134 | 6/1986 | Hanada et al. | 522/99 |

Primary Examiner—Melvyn I. Marquis
Attorney, Agent, or Firm—Roger H. Borrousch

[57] ABSTRACT

Spherical gel particles with elastomeric surfaces are made by dripping a liquid silicone gel composition containing alkenyl-containing organopolysiloxane, organohydrogenpolysiloxane, and a platinum catalyst into water or surfactant-containing water, curing and then contacting the surface of the silicone gel particles to organohydrogenpolysiloxane and curing to provide the elastomeric surface. The liquid silicone gel composition can also be extruded in fiber form into the water or surfactant-containing water with stirring to form the spherical particles which are cured and then the surface is contacted with organohydrogenpolysiloxane forming the silicone gel particles with elastomer surface. Alternatively, the liuqid silicone gel composition can be dripped or extruded in fiber form into a liquid having organohydrogenpolysiloxane to form the silicone gel particles with elastomer surface when the particles are cured. These spherical silicone gel particles are uniform and can be used to modify organic resins and be used for vibration absorption.

8 Claims, No Drawings

METHOD FOR THE PRODUCTION OF SPHERICAL SILICONE GEL PARTICLES

BACKGROUND OF THE INVENTION

1. Field of the Invention

The present invention relates to a novel method for the production of spherical silicone gel particles.

2. Prior Art and Problems Therein

A method is known from Japanese Patent Application Laid Open (Kokai) Number 59-68333 (68,333/84) which is essentially equivalent to U.S. Pat. No. 4,594,134, issued June 10, 1986, to Hanada et al for the production of spherical silicone resin or elastomer particles. In this method, a liquid silicone rubber composition is sprayed into a heated atmosphere and cured while in the sprayed state. Furthermore, Japanese Patent Application Laid Open Number 58-163652 (163,652/83) which is equivalent to U.S. Pat. No. 4,517,238, issued May 14, 1985, to Mine et al, discloses a silicone molding which has a silicone gel interior and a surface of silicone elastomer or resin and which is obtained by coating a silicone gel molding with a curing agent for said silicone gel.

However, while the former method does generate finely divided silicone elastomer particles, it does not afford spherical particles having silicone gel as the principal component. And in the latter method, while moldings consisting principally of silicone gel are produced in various configurations, finely divided spherical silicone gel particles are not included therein.

3. Problems to be Solved by the Invention

The present inventors carried out extensive investigations in order to solve the aforementioned problems and achieved the present invention as a result.

The object of the present invention is to introduce a highly productive method for the production of spherical silicone particles which consist of spheres principally composed of silicone gel and which approximate true spheres and have a uniform particle size.

SUMMARY OF THE INVENTION

Organization and Function of the Invention

The present invention relates to a method for the production of spherical silicone gel particles having a diameter of from 0.01 millimeters to 20 millimeters and having an elastomeric silicone layer on a silicone gel surface comprising (a) forming cured spherical silicone gel particles by dispersing spherical particles of a liquid silicone gel composition in water and curing, where the liquid silicone gel composition comprises (A) organopolysiloxane having at least two lower alkenyl groups in each molecule, (B) organohydrogenpolysiloxane having at least two silicon-bonded hydrogen atoms in each molecule, in a quantity such that the molar ratio between the total quantity of silicon-bonded hydrogen atoms in component (B) and the total quantity of all lower alkenyl groups in component (A) is from 0.1:1 to 1:1, and (C) a platinum catalyst as 0.1 to 1,000 parts by weight of platinum metal for each one million parts by weight of the total quantity of components (A) plus (B), and (b) forming the elastomeric layer on the surface of the spherical silicone gel particle by contacting the particles with organohydrogenpolysiloxane and curing to form the elastomer.

The present invention also relates to a method for the production of spherical silicone gel particles having diameters of 0.01 millimeters to 20 millimeters and having an elastomeric silicone layer on a silicone gel surface comprising forming cured spherical silicone gel particles by dispersing spherical particles of liquid silicone gel composition in a liquid which contains organohydrogenpoly-siloxane having at least two silicon-bonded hydrogen atoms in each molecule, and curing the dispersed spherical particles with the formation of spherical gel particles while at the same time the surface of the spherical silicone gel particles is cured to give the elastomer, where the liquid silicone gel composition comprises (A) organopolysiloxane having at least two lower alkenyl groups in each molecule, (B) organohydrogenpolysiloxane having at least two silicon-bonded hydrogen atoms in each molecule, in a quantity such that the molar ratio between the total quantity of silicon-bonded hydrogen atoms in component (B) and the total quantity of all lower alkenyl groups in component (A) is 0.1:1 to 1:1, and (C) a platinum catalyst at 0.1 to 1,000 parts by weight for each one million parts by weight of the total quantity of components (A) plus (B).

DESCRIPTION OF PREFERRED EMBODIMENTS

To explain the first method, component (A) is an organoppolysiloxane containing at least two silicon-bonded lower alkenyl groups and is the principal component for the generation of the silicone gel and silicone elastomer, and cures by an addition reaction with component (B) under catalysis by component (C). Component (A) must contain at least two silicon-bonded lower alkenyl groups in each molecule, and these lower alkenyl groups are exemplified by vinyl, allyl, and propenyl. The lower alkenyl groups can be present at any location in the molecule, but are preferably present at least at the molecular terminals. The molecular configuration of this component can be any of linear, branch-containing linear, cyclic, or network, but linear, possibly with slight branching, is preferred. The organic groups of the organopolysiloxane other than alkenyl can be monovalent hydrocarbon radicals and monovalent halogenated hydrocarbon radicals. Monovalent hydrocarbon radicals can be illustrated by alkyl, such as methyl, ethyl, butyl, and hexyl; aryl, such as phenyl or tolyl, and cyclohexyl. Monovalent halogenated hydrocarbon radicals can be illustrated by gammachloropropyl, 3,3,3-trifluoropropyl, and perfluoroalkylethyl, and chlorobenzyl.

While the molecular weight of this component is not specifically restricted except that it must not be too high because it must provide a liquid silicone gel composition, it is preferred that the viscosity at 25° C. be at least 0.100 Pa.s both in order to obtain cured material in the form of the silicone gel and in order to form an elastomeric silicone layer at the surface of said silicone gel. The organopolysiloxanes of (A) can be exemplified by methylvinylpolysiloxanes, methylvinylsiloxane-dimethylsiloxane copolymers, dimethylvinylsiloxy-terminated dimethylpolysiloxanes, dimethylvinylsiloxy-terminated dimethylsiloxane-methylphenylsiloxane copolymers, dimethylvinylsiloxy-terminated dimethylsiloxane-diphenylsiloxane-methylvinylsiloxane copolymers, trimethylsiloxy-terminated dimethylsiloxane-methylvinylsiloxane copolymers, trimethylsiloxy-terminated dimethylsiloxane-methylphenylsiloxane-methylvinylsiloxane copolymers, dimethylvinylsiloxy-terminated methyl(3,3,3-trifluoropropyl)polysiloxanes, dimethylvinylsiloxy-terminated dimethylsiloxane-methyl(3,3,3-trifluoropropyl)siloxane copolymers, and polysiloxanes composed of $CH_2=CH(CH_3)_2SiO_{1/2}$ units, $(CH_3)_3SiO_{1/2}$ units, and $SiO_{4/2}$ units, etc. Combinations of the above organopolysiloxanes can be used in the present invention.

Component (B) is a crosslinker for component (A), and curing proceeds by the addition reaction of the silicon-bonded hydrogen atoms in this component with the lower alkenyl groups in component (A) under catalysis by component (C). In order to function as a crosslinker, component (B) must contain at least two silicon-bonded hydrogen atoms in each molecule.

The molecular configuration of this component is not specifically restricted, and may be any of linear, branch-containing linear, cyclic, etc. While the molecular weight of this component is also not specifically restricted, it is preferred that the viscosity at 25° C. be 0.001 to 50 Pa.s in order to obtain a good miscibility with component (A).

This component is preferably added in a quantity such that the molar ratio between the total quantity of silicon-bonded hydrogen atoms in component (B) and the total quantity of all lower alkenyl groups in component (A) assumes values of 0.1:1 to 1:1, and quantities affording values of 0.3:1 to 0.8:1 for this molar ratio are particularly preferred. The crosslink density will be too low when this molar ratio falls below 0.1:1, and curing will then be unsatisfactory. The crosslink density is too high when 1:1 is exceeded, and a silicone gel will not be produced.

Examples of this component are trimethylsiloxy-terminated methylhydrogenpolysiloxanes, trimethylsiloxy-terminated dimethylsiloxane-methylhydrogensiloxane copolymers, dimethylhydrogensiloxy-terminated dimethylsiloxane-methylhydrogensiloxane copolymers, dimethylsiloxane-methylhydrogensiloxane cyclic copolymers, copolymers composed of $(CH_3)_2HSiO_{1/2}$ units and $SiO_{4/2}$ units, and copolymers composed of $(CH_3)_3SiO_{1/2}$ units, $(CH_3)_2HSiO_{1/2}$ units and $SiO_{4/2}$ units.

Component (C) is a platinum catalyst for the addition reaction of silicon-bonded hydrogen atoms and alkenyl groups. Examples of the platinum catalyst are chloroplatinic acid, possibly dissolved in an alcohol or ketone and this solution optionally aged, chloroplatinic acid/olefin complexes, chloroplatinic acid/alkenylsiloxane complexes, chloroplatinic acid/diketone complexes, platinum black, and supported platinum. This component is to be present at about 0.1 to 1,000 parts by weight as platinum metal for each one million parts by weight of the total quantity of components (A) plus (B). The crosslinking reaction will not proceed satisfactorily at below 0.1 weight parts while exceeding 1,000 weight parts is uneconomical. In typical applications, the addition of approximately 1 to 100 ppm platinum metal is preferred.

In order to adjust the fluidity or improve the mechanical strength of the molding, filler can be blended into the liquid silicone gel composition used in the present invention. These fillers are exemplified by reinforcing fillers such as precipitated silica, fumed silica, calcined silica, and fumed titanium oxide, and by nonreinforcing fillers such as quartz powder, diatomaceous earth, asbestos, alluminosilicate, iron oxide, zinc oxide, and calcium carbonate. Furthermore, these fillers can be used after a surface treatment with an organosilicon compound such as hexamethyldisilazane, trimethylchlorosilane, or polymethylsiloxane. In order to inhibit the curing reaction, small or very small quantities of acetylenic compounds, hydrazines, triazoles, phosphines, and mercaptans can be added to the organopolysiloxane composition used in the present invention as long as the object of the present invention is not adversely affected.

The liquid silicone gel composition can be prepared by simply mixing the aforementioned components (A) through (C) using a conventional means of mixing. However, with regard to mixing and storage, it is preferred that the liquid silicone gel composition be prepared by mixing said components (A) through (C) at temperatures within the range of −60° C. to +5° C. and that it be stored under the same temperature conditions. The component (A) organopolysiloxane will harden at below −60° C., while the addition reaction between components (A) and (B) can proceed when +5° C. is exceeded during mixing or storage. These occurrences create problems in the dripping process or extrusion of the liquid silicone gel composition and interfere with the production of almost perfectly spherical silicone particles.

In process (a) of the present invention, the water or surfactant-containing water functions to disperse the liquid silicone gel composition (dripped in or extruded in fiber form) to homogeneity, as well as, to disperse the spherical silicone gel particles resulting from the partial curing of said composition. The use of surfactant is preferred in order to disperse the spherical particles to homogeneity. This surfactant can be a nonionic or anionic surfactant or emulsifying agent as known in the art for the preparation of silicone water-based emulsions. However, surfactants which contain atoms which interfere with the catalytic activity of the platinum catalyst, for example, the sulfur atom, phosphorous atom, are to be avoided since otherwise curing of the liquid silicone gel composition will be inhibited. On the subject of the method in which the liquid silicone gel composition is extruded in fiber form into water or surfactant-containing water as described above, the extruded fibrous liquid silicone gel composition is dispersed to afford spheres by stirring the water or surfactant-containing water, and these spheres are cured to form spherical silicone gel particles, the silicone gel composition, after continuous extrusion as the fiber from, for example, a nozzle, is fragmented in the water or surfactant-containing water by the stirring action, and the surface tension causes the formation of silicone gel spheres. From the standpoint of productivity, extrusion of the liquid silicone gel composition in fiber form into water or surfactant-containing water set in motion by stirring is preferred. The intensity of stirring will vary with the quantity and cure rate of the fibrous extruded liquid silicone gel composition and so is not specifically restricted; however, in general stirring is required which will generate flow with a minimum flow rate of 0.1 cm/second.

In process (b) of the present invention, the organohydrogenpolysiloxane having at least two silicon-bonded hydrogen atoms in each molecule, or the liquid which contains such an organohydrogenpolysiloxane, functions to generate a silicone elastomer layer by curing the surface layer of the spherical silicone gel particles formed in process (a). This organohydrogenpolysiloxane will be a polysiloxane like the component (B) described as a constituent component of the aforementioned liquid silicone gel composition, and may or may not be identical to component (B). No specific restriction obtains on the liquid which can contain this organopolysiloxane as long as the spherical silicone gel particles generated in process (a) can be dispersed in it, but liquids which inhibit curing of the surface layer of said spherical silicone gel particles and solvents which swell the spherical silicone gel particles should be avoided. Examples of such liquids are water, liquid paraffins, waxes, and fluids variously employed as thermal media, for example, water, dimethylsilicone oils, phthalate esters, etc. Among these, water is particularly preferred for its high heat capacity and ease of handling. With regard to the temperature of the water or surfactant-containing water in process (a) and the temperature in process (b) of the organohydrogenpolysiloxane having at least two silicon-bonded hydrogen atoms in each molecule or liquid containing such an organohydrogenpolysiloxane, this value is preferably at least 25° C. and more preferably is at least 50° C. in order to accelerate crosslinking or curing of the liquid silicone gel composition.

The present invention's spherical silicone particles prepared as described herein consist of spherical silicone particles having diameters of 0.01 millimeters to 20 millimeters and having a layer of silicone elastomer on a silicone gel surface. This silicone gel, in contrast to the above-described fluid liquid silicone gel composition, is a silicone which exhibits deformation and limited fluidity in response to the application of stress as a consequence of the partial conversion of the liquid silicone gel composition into a three-dimensional network structure by crosslinking. Its hardness does not exceed 50 when measured by a spring-type testing machine used in a hardness test of Japanese Industrial Standard (JIS) S6050-1983 plastic erasers on an ASKER C scale durometer tester sold by Kobunshikeiki Corporation, Japan, and does not exceed zero on the A scale when measured by a JIS hardness tester. With regard to the elastomeric silicone, in this case the liquid silicone gel composition has been entirely converted into a three-dimensional network structure by means of crosslinking to provide a silicone which is deformed by the application of stress and which recovers its original state with disappearance of the deformation when the stress is removed. The silicone elastomer has a hardness in excess of zero on the A scale as measured using a JIS hardness tester, but in the present invention its hardness preferably is at least ten and more preferably is at least twenty. When this value falls below ten, the surface of the spherical silicone gel particles will be tacky, and the elastomeric silicone will tend to have a reduced mechanical strength and may become unable to maintain the shape of the spherical silicone gel particles.

The thickness of the silicone elastomer layer is not specifically restricted as long as it is sufficiently thick to maintain the shape of the present invention's spherical silicone particles on a semipermanent basis. The spherical silicone particles of the present invention have diameters within the range of 0.01 millimeters to 20 millimeters. This is because spherical silicone particles approaching perfect spheres essentially cannot be produced when the diameter falls outside this range.

To explain the second method, the liquid silicone gel composition consisting of the above-described components (A) through (C) is identical to that used in the first method. This liquid silicone gel composition is dripped into a liquid which contains organohydrogenpolysiloxane having at least two silicon-bonded hydrogen atoms in each molecule, and this dripped-in material is cured with the formation of spherical gel particles while at the same time the surfaces of said spherical gel particles are cured to give the elastomer. Alternatively, the liquid silicone gel composition is extruded in fiber form into liquid containing organohydrogenpolysiloxane having at least two silicon-bonded hydrogen atoms in each molecule, this extruded fibrous liquid silicone gel composition is then dispersed into the spherical form by means of stirring said liquid containing organohydrogenpolysiloxane having at least two silicon-bonded hydrogen atoms in each molecule, and the spherical particles are cured to afford spherical silicone gel particles while at the same time the surface layers of said spherical silicone gel particles are cured to give the elastomer.

As in the first method, in the present case the organohydrogenpolysiloxane having at least 2 SiH in each molecule functions to cure the surface layer of the spherical silicone gel particles to the level of the elastomer. This organohydrogenpolysiloxane falls into the same class as the organohydrogenpolysiloxane of component (B) described above, and may be identical to or different from component (B). A liquid such as that used in the first method can be used as the liquid which is to contain the organohydrogenpolysiloxane, but water is particularly preferred for its high heat capacity and ease of handling. Furthermore, the use of a liquid which contains a surfactant as described for the first method is preferred in order to produce spherical silicone microparticles having uniform particle sizes.

In order to disperse the liquid silicone gel composition and shperical silicone gel particles to homogeneity for the purposes of preparing uniform spherical silicone particles and increasing the productivity, it is preferred that the liquid silicone gel composition be continuously extruded in fiber form into liquid which contains organohydrogenpolysiloxane having at least 2 SiH in each molecule and which has been set in motion by stirring. The intensity of stirring will vary with the quantity and curing rate of the extruded fibrous liquid silicone gel composition and so is not specifically restricted; however, it is preferred that stirring generate flow at a rate of at least 0.1 cm/second.

When this flow rate falls below 0.1 cm/second, neither the dripped-in liquid silicone gel composition nor in particular the extruded fibrous liquid silicone gel composition will be fragmented and subdivided by the flow of the stirred liquid. Continuous connections may then form, generating a tendency for the silicone molding to be connected into a fiber rather than being spherical. The direction of flow is not specifically restricted, but flow in a constant direction is preferred. Examples of the flow regime are horizontal flow (flow in the horizontal direction), rotating flow (concentric rotating flow toward the center), and falling flow (flow from a higher point to a lower point). Furthermore, in this method, the temperature of the liquid which contains organohydrogenpolysiloxane having at least 2 SiH in each molecule is preferably at least 25° C. and more preferably is at least 50° C. in order to accelerate curing or crosslinking of the liquid silicone gel composition.

The spherical silicone particles prepared as above by the method of the present invention have the properties of a silicone gel, and, in addition, because they are minute spheres having uniform particle diameters but lacking the tack of a silicone gel, they can be easily handled and can be used as modifying additives for various organic resins. They can also be used as vibration-resistant or shock-absorbing materials.

EXAMPLES

The present invention will be explained in the following using illustrative examples. In the examples, parts = parts by weight.

EXAMPLE 1

A mixture A was prepared by combining and mixing 30 parts dimethylvinylsiloxy-terminated dimethylpolysiloxane having a viscosity of 1.0 Pa.s and a vinyl group content of 0.25 wt %, 70 parts dimethylvinylsiloxy-terminated dimethylsiloxane-methylvinylsiloxane copolymer with a viscosity of 1.0 Pa.s and a vinyl group content of 0.5 wt %, and 1.5 parts trimethylsiloxy-terminated methylhydrogenpolysiloxane having a viscosity of 0.005 Pa.s and contaning 0.8 wt % silicon-bonded hydrogen atoms. A mixture B was prepared by combining and mixing 30 parts of the dimethylpolysiloxane as described above, 70 parts of the dimethylsiloxane-methylvinylsiloxane copolymer as described above, and 0.6 parts isopropanolic chloroplatinic acid (platinum metal content=3 wt %).

A liquid silicone gel composition was prepared by supplying these mixtures A and B to a static mixer which had been cooled in advance to −10° C. using a pressure-delivery pump and by mixing these mixtures A and B at a 1:1 weight ratio.

100 Parts hot water, 5 parts trimethylsiloxy-terminated methylhydrogenpolysiloxane having a viscosity of 0.005 Pa.s and containing 0.8 wt % silicon-bonded hydrogen atoms, and 1 part surfactant (trimethylnonanol-ethylene oxide adduct, Tergitol TMN-6, nonionic surfactant from Union Carbide Corporation) were placed in a water bath. A stirring paddle for generating vortex flow was installed at the center of this water bath. After stirring to homogeneity, the temperature was adjusted to 80° C. and a vortex flow was set up in the water bath. The flow rate of the methylhydrogenpolysiloxane-containing hot water at this point was 21 cm/second at the circumference of the water bath.

The liquid silicone gel composition prepared as described above was then continuously extruded via an extrusion nozzle into this methylhydrogenpolysiloxane-containing hot water bath at its circumference. The liquid silicone gel composition extruded from the nozzle described a circular orbit in the methylhydrogenpolysiloxane-containing hot water and was fragmented, converted into the spherical form, and cured. The cured product was removed from the water bath and dried in an oven at 80° C. for 30 minutes. The external appearance and physical properties were then examined, with the following results.

- external appearance: perfect spheres, transparent
- average particle diameter: 1.5 millimeters specific gravity: 0.98
- hardness of the internal layer of the spheres: 5 (C scale), 0 (A scale)
- hardness of the outer layer of the spheres: 21 (A scale)

EXAMPLE 2

Silicone gel composition, prepared as in Example 1 was dripped into a hot water bath (85° C.) containing 1% surfactant as in Example 1 and was cured. The cured material consisted of sticky spherical silicone gel particles. These silicone gel spheres were removed, immersed for 1 minute in an aqueous solution containing 15 wt % methylhydrogenpolysiloxane (SiH content=0.8 wt %) and 1 wt % surfactant, removed, and then heated in an oven at 80° C. for 30 minutes to afford silicone spheres (average particle diameter=0.3 millimeters) having an interior of silicone gel and a surface covered with silicone elastomer. These silicone spheres were not sticky and did not adhere to one another.

Effects of the Invention

Because the present invention comprises a method for the production of spherical silicone particles having diameters of 0.01 millimeters to 20 millimeters and having a silicone elastomer layer on a silicone gel surface, wherein the method characteristically consists of the following processes (a) and (b):

(a) a process in which a specific liquid silicone gel composition prepared from components (A) through (C) is dripped into water only or into surfactant-containing water and said dripped-in material is cured to form spherical silicone gel particles, or a process in which said liquid silicone gel composition is extruded in fiber form into water only or into surfactant-containing water, this fibrous extruded liquid silicone gel composition is dispersed into spherical form by stirring the water or surfactant-containing water, and these spheres are cured to afford spherical silicone gel particles, (b) a subsequent process in which the above spherical silicone gel particles are placed in an organohydrogenpolysiloxane having at least two silicon-bonded hydrogen atoms in each molecule, or in a liquid which contains such an organohydrogenpolysiloxane, thus to cure the surface layer of the spherical gel particles to give the elastomer.

The present invention characteristically provides spherical silicone particles with uniform particle diameters and almost perfectly spherical shapes, in the form of spheres which have silicone gel as the principal component, which are almost perfectly spherical, which have a uniform particle size, and which can have any size, small to large, according to the objective.

Furthermore, the present invention also comprises a method for the production of spherical silicone particles having diameters of 0.01 millimeters to 20 millimeters and having a silicone elastomer layer on a silicone gel surface, wherein said method has the characteristic that a specific liquid silicone gel composition comprising components (A) through (C) is dripped into a liquid which contains organohydrogenpolysiloxane having at least two silicon-bonded hydrogen atoms in each molecule and said dripped-in material is cured to form spherical gel particles while at the same time the surface of said spherical silicone gel particles is cured to give the elastomer; or, has the characteristic that said liquid silicone gel composition is extruded in fiber form into a liquid which contains organohydrogenpolysiloxane having at least two silicon-bonded hydrogen atoms in each molecule, this extruded fibrous liquid silicone gel composition is dispersed to give spherical particles by stirring said liquid containing organohydrogenpolysiloxane having at least two silicon-bonded hydrogen atoms in each molecule, and these spheres are cured to form spherical silicone gel particles while at the same time the surface of said spherical silicone gel particles is cured to give the elastomer. As a consequence, the present invention characteristically provides for the continuous, high-productivity production of silicone spheres having uniform particle diameters, which are almost perfectly spherical, and which principally consist of silicone gel.

That which is claimed is:

1. A method for the production of spherical silicone gel particles having a diameter of from 0.01 millimeters to 20 millimeters and having an elastomeric silicone layer on a silicone gel surface comprising
   (a) forming cured spherical silicone gel particles by dispersing spherical particles of a liquid silicone gel composition in water and curing, where the liquid silicone gel composition comprises
      (A) organopolysiloxane having at least two lower alkenyl groups in each molecule,
      (B) organohydrogenpolysiloxane having at least two silicon-bonded hydrogen atoms in each molecule, in a quantity such that the molar ratio between the total quantity of silicon-bonded hydrogen atoms in component (B) and the total quantity of all lower alkenyl groups in component (A) is from 0.1:1 to 1:1, and
      (C) a platinum catalyst at 0.1 to 1,000 parts by weight of platinum metal for each one million parts by weight of the total quantity of components (A) plus (B), and
   (b) forming the elastomeric layer on the surface of the spherical silicone gel particle by contacting the particles with organohydrogenpolysiloxane and curing to form the elastomer.

2. The method according to claim 1 in which (a) comprises dripping the liquid silicone gel composition into water and curing the dripped-in composition with the formation of spherical silicone gel particles and in which (b) is a subsequent process in which the spherical silicone gel particles are placed in the organohydrogenpoly-siloxane which has at least two silicon-bonded hydrogen atoms in each molecule, or in a liquid which contains such an organohydrogenpolysiloxane, and the surface layer of the spherical silicone gel particles is cured to give the elastomer.

3. The method according to claim 2 in which the the silicone gel composition is dripped into surfactant-containing water.

4. The method according to claim 1 in which (a) comprises extruding in fiber form the liquid silicone gel composition into water, dispersing the extruded liquid silicone gel composition into spherical form by stirring the water, and curing the spherical particles to form spherical silicone gel particles, and in which (b) is a subsequent process in which the spherical silicone gel particles are placed in an organohydrogenpolysiloxane having at least two silicon-bonded hydrogen atoms in each molecule, or in a liquid which contains such an organohydrogenpolysiloxane, and the surface layer of said spherical silicone gel particles is cured to give the elastomer.

5. The method according to claim 4 in which the liquid silicone gel composition is extruded into surfactant-containing water.

6. A method for the production of spherical silicone gel particles having diameters of 0.01 millimeters to 20 millimeters and having an elastomeric silicone layer on a silicone gel surface comprising
   forming cured spherical silicone gel particles by dispersing spherical particles of liquid silicone gel composition in a liquid which contains organohydrogenpoly-siloxane having at least two silicon-bonded hydrogen atoms in each molecule, and
   curing the dispersed spherical particles with the formation of spherical gel particles while at the same time the surface of the spherical silicone gel particles is cured to give the elastomer, where the liquid silicone gel composition comprises
      (A) organopolysiloxane having at least two lower alkenyl groups in each molecule,
      (B) organohydrogenpolysiloxane having at least two silicon-bonded hydrogen atoms in each molecule, in a quantity such that the molar ratio between the total quantity of silicon-bonded hydrogen atoms in component (B) and the total quantity of all lower alkenyl groups in component (A) is 0.1:1 to 1:1, and
      (C) a platinum catalyst at 0.1 to 1,000 parts by weight for each one million parts by weight of the total quantity of components (A) plus (B).

7. The method according to claim 6 in which the liquid silicone gel composition is dripped into the liquid containing the organohydrogenpolysiloxane.

8. The method according to claim 6 in which the liquid silicone gel composition is extruded in fiber form into the liquid containing the organohydrogenpolysiloxane and the extruded fiber is dispersed to give spheres by means of stirring.

* * * * *